T. E. MURRAY.
PIPE COUPLING.
APPLICATION FILED MAR. 28, 1918.
1,316,381. Patented Sept. 16, 1919.
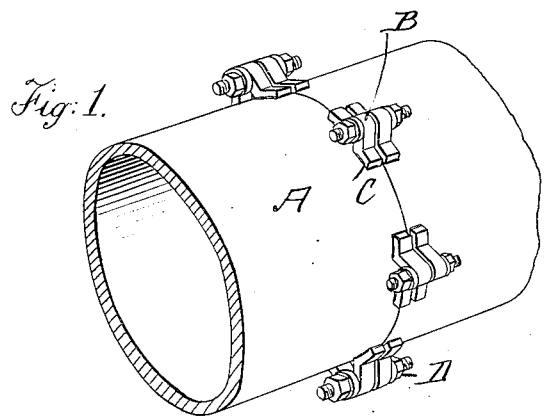
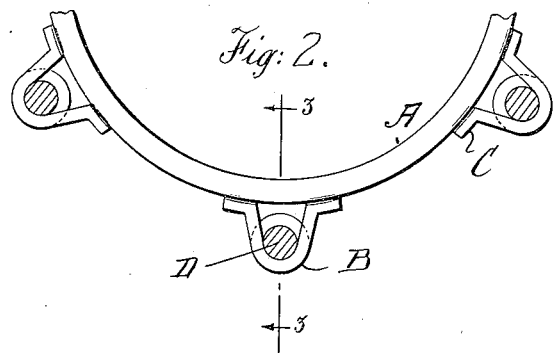
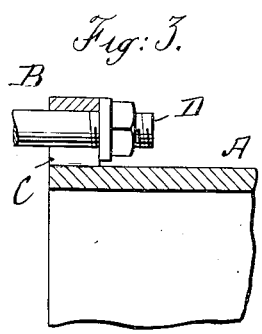
Inventor
Thomas E. Murray
By his Attorney
Paul Benjamin

UNITED STATES PATENT OFFICE.

THOMAS E. MURRAY, OF NEW YORK, N. Y.

PIPE-COUPLING.

1,316,381.  Specification of Letters Patent.  Patented Sept. 16, 1919.

Application filed March 28, 1918. Serial No. 225,155.

*To all whom it may concern:*

Be it known that I, THOMAS E. MURRAY, a citizen of the United States, residing at New York, in the county of New York and State of New York, have invented a certain new and useful Improvement in Pipe-Couplings, of which the following is a specification.

The invention is a new article of manufacture and sale, consisting of a pipe or tube and a plurality of loops disposed circumferentially around and near one end thereof. Said loops are individually struck up, stamped, or pressed from sheet metal, and at the ends of their arms have flanges which are electrically welded to said pipe.

In the accompanying drawings—

Figure 1 is a perspective view showing two pipes provided with loops, as hereinafter set forth, and coupled together. Fig. 2 is an enlarged transverse section of a portion of the pipe showing three of the loops thereon. Fig. 3 is a section on the line 3 3 of Fig. 2.

Similar letters of reference indicate like parts.

A is a metal pipe or tube. The coupling loops B are separately stamped, struck up or pressed from sheet metal. The arms of each loop have flanges C, which conform in curvature to the pipe. The several loops B are placed in contact with the pipe, near one end thereof, and preferably at equal distances around the circumference. The flanges C of said loops are electrically welded to the pipe, so that pipe and loops form an integral structure. In order to connect pipe ends together, I place said ends in contact as shown in Fig. 1, with the loops registering, and connect the loops on one pipe with those on the other by means of headed bolts D.

The pipe with the loops near the end forms a single article of manufacture and is intended to replace such constructions as a pipe having an integral flange with bolt openings in said flange, especially in cases where the metal of the pipe is thin. In such event the portions of the flanges between the bolts are apt to spring apart, resulting in leakage at the joint if the pipes contain fluid under pressure.

My loops on the other hand are placed edge to edge, so that the bolt in each pair of loops has a strong and wide support. At the actual joint between the pipe ends, pressure of each bolt is applied at the ends of the loop arms, instead of at one point as when a bolt enters registering openings in opposing flanges. The loops are very cheaply and rapidly stamped from sheet metal, and their electrical welding to the pipe is very rapidly done; so that this construction in the end is cheaper to make than a perforated integral flange on the pipe end, and besides saves metal.

I claim:

1. As a new article of manufacture and sale, a pipe and a plurality of loops having flanges at the end of their arms, the said flanges being electrically welded to the said pipe and the outer edge faces of said loops registering with the edge face of said pipe.

2. In combination with pipes of uniform external diameter with unflanged ends, a coupling, comprising a plurality of separate loops having flanges at the ends of their arms, the said loops being spaced apart on the exterior of said pipes and united thereto by electrical welding, and clamping bolts engaging said loops and retaining the said pipes in butt contact.

In testimony whereof I have affixed my signature in presence of two witnesses.

THOMAS E. MURRAY.

Witnesses:
 GERTRUDE T. PORTER,
 MAY T. MCGARRY.